H. A. GARDNER.
FABRIC FOR AIRSHIPS AND PROCESS OF MAKING SAME.
APPLICATION FILED JAN. 6, 1920.
1,381,412. Patented June 14, 1921.
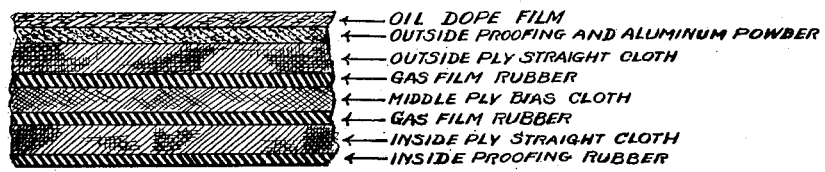
← OIL DOPE FILM
← OUTSIDE PROOFING AND ALUMINUM POWDER
← OUTSIDE PLY STRAIGHT CLOTH
← GAS FILM RUBBER
← MIDDLE PLY BIAS CLOTH
← GAS FILM RUBBER
← INSIDE PLY STRAIGHT CLOTH
← INSIDE PROOFING RUBBER
Inventor
H.A. Gardner
By
Attorney

UNITED STATES PATENT OFFICE.

HENRY A. GARDNER, OF WASHINGTON, DISTRICT OF COLUMBIA.

FABRIC FOR AIRSHIPS AND PROCESS OF MAKING SAME.

1,381,412.  Specification of Letters Patent.  Patented June 14, 1921.

Application filed January 6, 1920. Serial No. 349,836.

*To all whom it may concern:*

Be it known that I, HENRY A. GARDNER, a citizen of the United States, residing at Washington, District of Columbia, have invented new and useful Improvements in Fabrics for Airships and Processes of Making Same, (Case B,) of which the following is a specification.

This invention relates to airship fabrics and process of making the same and an object of the invention is to provide a fabric which will not deteriorate due to the action of light and heat.

Another object of the invention is to provide an elastic, impervious fabric of low diffusion to prevent the escape of gas.

Another object of the invention is to provide a novel process of manufacture of the fabric.

A further object of the invention is to provide a novel process of manufacture of the fabric wherein the fabric may be treated at intervals, thus avoiding the expense of new fabric.

Airships of the non-rigid type are usually constructed of fabric made of cotton that has been proofed with rubber. For instance, a fabric that has been found highly satisfactory for this purpose and that is being used to a great extent at the present time has the following construction:

| | |
|---|---|
| Outside proofing and aluminum powder | 1.7 |
| Outside ply (straight cloth) | 2.5 |
| Gas film (rubber) | 1.6 |
| Middle ply (bias cloth) | 2.5 |
| Gas film (rubber) | 3.6 |
| Inside ply (straight cloth) | 2.5 |
| Inside proofing (rubber) | 1.0 |
| Total | 15.4 |

Strength: Warp—80 lbs. per inch width. Filling—70 lbs. per inch width.

Permeability: 15 liters of hydrogen per square meter in 24 hours at 25° C.

The drawing is a sectional view of a portion of the fabric illustrating the arrangement of the substances or material applied thereto. The middle ply, designated at 10, is coated on both sides with rubber, forming gas films 11. The outer ply 12 of straight cloth adheres to the gas film 11 and is coated with rubber proofing containing aluminum powder to form a film for layer 13. The inner ply 14 of straight cloth also adheres to the gas film 11 and is coated with rubber proofing, forming a film 15. The film 13 is coated with dope solutions to form films or layers 16 and 17, as hereinafter described.

Due to the action of light and heat, the rubber proofing used in rubberized fabrics becomes oxidized and breaks down after a period of time. A brittle fabric of high diffusion then results, and rapid leakage of hydrogen takes place. Such a result makes it necessary to feed the ships large quantities of gas, daily, in order to keep up the purity and lifting power. If the fabric becomes acted upon to a great extent, it becomes rotted and is unsafe for use.

On fabric that is showing deterioration, it has previously been proposed to use a dope consisting of nitro-cellulose dissolved in amyl acetate and similar solvents. When five coats of such dope are applied, the diffusion is greatly lowered, but exposure of the doped fabric may result in the breaking up of the nitro-cellulose and the formation of small amounts of free nitric acid which will cause rotting of the cotton cloth.

I have found that after long use, a fabric that is starting to exhibit signs of decay may be preserved from further decay by the application of a special oil dope free from ingredients containing mineral acid compounds. I have, moreover, found that linseed oil and similar oils are impractical for use as dopes due to the oxygen absorption of such oils and their consequent effect upon the rubberized fabric. The oil I use in the dope I have referred to, is tung oil, a product which dries largely through polymerization rather than oxidation. In my process, I heat tung oil in a kettle until it becomes very heavy bodied, but I do not bring it to such a temperature that polymerization to a solid mass will take place. During the process of heating, I may add a small percentage of resin for example, ester gum and certain metallic driers, such as cobalt, lead or manganese linoleates or resinates and then thin down with suitable volatile or other thinners. The resulting dope is then ready for use.

In my process, I first apply one coat of tung oil dope that is rich in resins. This coating or film, designated in the drawing at 16 is preferably of the following composition:—ester gum 150 parts, tung oil, 150 parts, oil driers 15 parts, turpentine 50 parts, mineral spirits 220 parts. This dope dries very rapidly and due to this property prevents the softening of the rubber proofing on the fabric. I then apply one coat of a similar type of tung oil dope that is low in resins and rich in oil. This dries in from 2 to 4 hours.

For instance, with rubberized airship fabric having a diffusion of 15 liters in 24 hours, the application of two coats of the above types of dope produces a fabric having a diffusion of only 2 liters. Exposure tests of such fabric over a period of several months, exposed directly to the sun and heat, have shown but slight lowering of this result.

It will be understood that the process of manufacture may be varied in unessential particulars, and that equivalent ingredients may be used in the place of the ones mentioned without departure from the principles of the invention. I do not restrict myself to precise proportions of materials or to other unessential limitations but contemplate such variations as are within the principles of the invention as set forth in the appended claims.

What I claim is:

1. A fabric of the class described comprising a basic material of cloth proofed with rubber and a film of elastic impervious oil on said rubber.

2. A fabric as set forth in claim 1, and a second film of elastic impervious oil on said first-named film.

3. A fabric as set forth in claim 1, said film of elastic impervious oil having a high percentage of resin.

4. A fabric as set forth in claim 2, said second film of oil having a low percentage of resin.

5. A fabric as set forth in claim 4, said first named film of oil having a high percentage of resin.

6. A fabric of the class described comprising a basic material of cloth proofed with rubber and an elastic impervious film of tung oil on said rubber.

7. A fabric as set forth in claim 6 and a second elastic impervious film of tung oil on said first named film of oil.

8. A fabric as set forth in claim 7, said first named film of tung oil having a high percentage of resin, and said second named film of tung oil having a low percentage of resin.

9. The fabric of the class described comprising a basic material of cloth proofed with rubber and a film of oil of the class which dries by polymerization on said rubber.

10. The fabric set forth in claim 9 and a second film of oil of the class which dries by polymerization on said first named film.

11. The fabric as set forth in claim 9, said film of oil having a high percentage of resin.

12. The fabric as set forth in claim 10, said second film of oil having a low percentage of resin.

13. The fabric as set forth in claim 11, said first-named film of oil having a high percentage of resin.

14. The process of making airship fabric which consists in coating a basic material proofed with rubber with film of oil of the class which dries by polymerization.

15. The process as set forth in claim 14 including the application of a second film of oil on said first named film.

16. The process as set forth in claim 14, said first named film of oil having a high percentage of resin.

17. The process as set forth in claim 15, said second film of oil having a small percentage of resin.

18. The process as set forth in claim 15, said first named film of oil having a high percentage of resin, and said second named film of oil having a low percentage of resin.

19. The process of making airship fabric which consists in coating a basic material proofed with rubber, with an elastic impervious film of tung oil.

20. The process as set forth in claim 9 including the application of a second elastic impervious film of tung oil on said first named film.

21. The process as set forth in claim 9 said film of tung oil having a high percentage of resin.

22. The process as set forth in claim 20, said second film of oil having a low percentage of resin.

23. The process as set forth in claim 20, said first film of tung oil having a high percentage of resin, said second named film of tung oil having a low percentage of resin.

24. The process of making airship fabrics having a base of cloth proofed with rubber, which consists in heating to a heavy consistency an oil of the class which dries by polymerization, adding variable quantities of resin, thinning the resultant mixture with a suitable volatile thinner to produce a dope and applying said dope to said rubber proofed base.

Signed at Washington, District of Columbia, this 3d day of December, 1919.

HENRY A. GARDNER.